United States Patent [19]
Rundle et al.

[11] Patent Number: 5,588,538
[45] Date of Patent: Dec. 31, 1996

[54] TIRE STACKING METHOD AND APPARATUS

[76] Inventors: Christopher Rundle, 12598 SW. 60th Ct., Miami, Fla. 33156; Michael Borell, 7787 SW. 86th St., Apt. 310, Miami, Fla. 33143

[21] Appl. No.: 527,629

[22] Filed: Sep. 13, 1995

[51] Int. Cl.[6] ................................................. B65D 85/06
[52] U.S. Cl. .................... 211/23; 206/304.2; 211/49.1; 211/59.1; 414/786; 414/908
[58] Field of Search ...................... 53/397, 399; 206/304, 206/304.2, 436, 822; 414/786, 789.8, 791.5, 28, 908; 211/23, 59.1, 24, 49.1, 196, 198, 200, 201; 100/30, 34, 296, 912

[56] References Cited

U.S. PATENT DOCUMENTS

| | | | |
|---|---|---|---|
| 3,547,258 | 12/1970 | Black | 211/23 X |
| 3,850,295 | 11/1974 | Black | 206/304 |
| 4,057,141 | 11/1977 | Laurie et al. | 206/304 |
| 4,684,026 | 8/1987 | Takeuchi et al. | 206/822 X |
| 5,236,756 | 8/1993 | Halliburton | 206/304 X |

*Primary Examiner*—Karen B. Merritt
*Assistant Examiner*—Janice L. Krizek
*Attorney, Agent, or Firm*—McHale & Slavin, P.A.

[57] ABSTRACT

The instant invention is a method and apparatus for stacking discarded tires for use in the formation of non-degradable structures and supports. The method consists of placing discarded vehicle tires on banding posts that are capable of maintaining numerous cut tires in-line. The tire stacks form part of a triangular bundle which allows for the formation of hexagon shaped bundles of a vertical disposition providing predictable compressibility and longevity for use in artificial reefs, structure support for buildings and pavement. In addition, placement of the triangular tire stacks in a horizontal position allows for formation of wave reducing reefs or levy construction.

14 Claims, 2 Drawing Sheets

TIRE STACKING METHOD AND APPARATUS

FIELD OF THE INVENTION

This invention relates to the disposal of tires and more particularly to a tire stacking method and apparatus allowing for the creation of support structures formed from discarded tires.

BACKGROUND OF THE INVENTION

One of the most important components on a truck or automobile is the tire. The tire provides the only contact with the surface of a road exposing it to the harshest elements. For this reason, an ongoing effort is directed to improving rubber compounds used in the manufacture of tires making them resistant to degradation. The use of non-degrading materials poses a serious problem as wear resistance eliminates conventional landfill composting.

In the United States alone nearly three hundred million automobile and truck tires are discarded each year. Previously the tires were placed in common landfills consuming a volume of non-fillable space. To lessen the burden on common landfills, tires are now separated from household waste materials and placed in specialty landfills. Tire landfills created new problems forming unsightly disposal areas that are suspectable to fire and related health hazards. Tires also trap water within the cavities producing countless bodies of water ideal for breeding mosquitoes. While various recycling processes are known, in most instances the cost is prohibitively high, maintaining landfills as the most viable alternative for disposal.

A tire landfill placed in the ocean is known as an artificial reef. Reefs are tropical ecosystems containing layers of living corals, photosynthetic plants, water polyps and algae. Herbivorous fish, such as butterfly fish, sea urchins, sea cucumbers, brittle stars and numerous species of mollusks feed on the algae. Hiding in the nooks and crevices of the reefs are predatory animals such as crabs, moray eels and sharks. Thus, an artificial reef must be as stable as a natural reef to support marine life.

An artificial reef constructed of tires is beneficial to marine life and commonly consists of hundreds of tires piled together. The problem with simply piling tires is that the ocean current easily dislodges the tires making the pile unstable. Despite the resistance to degradation, tire reefs are not frequently used as the tires trap air providing buoyancy to the dump making them susceptible to movement and questionable for reef stability.

As the natural reefs are continually destroyed, artificial reefs have significantly played an important role in providing shelter, food, protection and spawning areas for hundreds of species of fish and other marine organisms. An ongoing effort is made to find materials suitable for the construction of artificial reefs such as tires but may include rock, ships, planes, cars, heavy-gauge steel structures such as oil platforms and fishing piers. In Florida, the most active reef-developing state, nearly everything and anything has been sunk and there are more than 350 sites containing waste products, most of which degrade in seawater.

While the bulk of the artificial reefs are aging ships, the Florida shore line is littered with items such as dumpsters in St. Augustine, bathtubs in Stuart, a Rolls Royce in Riviera Beach, an airplane in Miami, commodes in Marco Island, buses and Coca Cola trucks in Naples, railroad box cars in Sarasota, and washers and dryers in Ft. Walton Beach.

Another use for used tires is that of a controlled landfill. For instance, structures such as levies and dikes require a base fill or support structure. Typically the fill is surrounding soil that, if removed from an area close to the construction, may result in ground instability. The infamous Japanese airport is built on soil fill material and is currently sinking at an alarming rate. Similarly, housing construction requires the use of support material. If the soil used is not stable, the result will be wall crack. In this manner, all structures would benefit from the use of clean predictable backfill. Despite the durability of rubber, tires are not used in such a situation due to the compressibility of the structure. Tires that are shredded must be combined with other items to prevent from floating away or shifting.

Thus, what is lacking in the art is a method and apparatus for employing used tires for the formation of various structures such as artificial reefs as well as the underlying structures of buildings, levies and so forth providing a clean, low cost and predictable landfill.

SUMMARY OF THE INVENTION

The instant invention is a method and apparatus for stacking discarded tires in such a manner so as to create a stable support structure having a predefined geometric shape. The stacking method utilizes tires that have been cut into two equal halves so as to allow positioning in a like directional pattern.

This invention is related to co-pending patent application having Ser. No. 08/402,043 entitled Tire Cutting Apparatus. The co-pending invention provides a point-of-use apparatus capable of cutting a tire in two equal halves thereby allowing one half of the tire to be stacked on top of the other half. The primary advantage of the tire cutter is to lessen the impact on transportation and landfill space, the teaching of stacking geometry the subject of this patent.

A banding post used in combination with the stacking method maintains the tires in an upright, fixed position. The post is used in placing the tires in a bundled triangular pattern allowing for free-standing stable structure capable of providing stable reef construction, or for use as a support structure.

The banding post is constructed of non-degradable material such as plastic or in instances of desired compressibility, stainless steel. The post stores as a cylindrical object and can be quickly configured by extending engagement arms outward from the axis of the post providing a base for tire halves. Each tire half placed over the adjacent tire to form a stack as large as the banding post, preferably fifteen to twenty feet tall. The tires are secured in position by an elastic strap coupling an outer end of one banding arm to an opposite banding arm along the outer peripheral edge of the stacked tires.

The preferred geometric embodiment is a triangular shape using three stacks of tires placed in a straight row, followed by two stacks of tires, followed by a single stack of tires. The resulting triangular shape is banded together forming a unitary bundle. Bundles may then be positioned in such a manner so as to form a hexagon, the basic building block in a honeycomb structure.

The tire stacking method of the instant invention allows for improvement of the underlying structures such as levies and dikes. By use of the disclosed structure in combination with an overlay of polyethylene and backfill, a structure is provided that costs less to produce than conventional levies and eliminates the need for valuable backfill. Banding of the bundles together, and by placement of the tire curvature in a proper position, lessens dislodgment by directing water flow around the curvature of the tires. This has particular usage in such areas as the Mississippi whose levies have been placed under a severe strain in recent years. By use of the artificial base, water saturation will not affect the levy and the rich soil around the river need not be wasted on levy construction.

The instant method and apparatus further allows for the formation of substructures for pavement and buildings. Recycled tires provide an impervious and non-degradable support structure utilizing materials that would otherwise consume a landfill. The tire structure providing a preferred support having minimal compressibility which provides an acceptable movement for settling and serves to inhibit cracks in the housing structure. In this manner, the tire bundles provide a support surface that allows for minimal compressibility, thus very beneficial in areas prone to earthquakes. In operation, an evacuated area is filled with hexagonal shaped bundles utilizing polyethylene mesh to join each bundle providing one main foundation. In the event of subterranean earth movement, the foundation will only give at the point of weakness, thus maintaining stability along the surface. If any of the lower levels remain stable the entire structure remains intact.

Tires may also be used as airport fill by incorporation of the hexagonal design as a foundation. The tire structure is covered with gravel followed by polyethylene mesh, preferably covered with a layer of ground rubber, with the airport surface placed thereon. The structure providing compressibility which is beneficial for heavy planes which produce excessive pressure on the surface. Placement of the stacked bundles in the ocean provides a stable artificial reef. Unlike previous tire reefs, the instant design provides a unique stability by removal of the chamber within the sidewalls of the tire notorious for trapping air. The stacking method further provides for crevices that enhance the ecosystems by providing secure areas for the marine life. A variation to the placement of the reef allows for construction of an inexpensive wave reducing reef. The tire stacks may be formed on land and simply placed in position by use of a barge, the weight of the structure increasing underwater as the air escapes from the formed chambers.

Thus, an objective of the instant invention is to teach a device that allows for the uniform stacking of discarded tires and discloses a method of arranging the tires providing support structures.

Still another objective of the instant invention is to provide a clean fill for support of buildings, airports, and the like structures that may benefit from a vertical geometric shape.

Another objective of the instant invention is to disclose a geometric shape of discarded tires in a horizontal plane to form a wave reducing reef or for use in levy construction.

Another objective of the instant invention is to teach the proper construction of an artificial reef using split tires.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Figure 1:
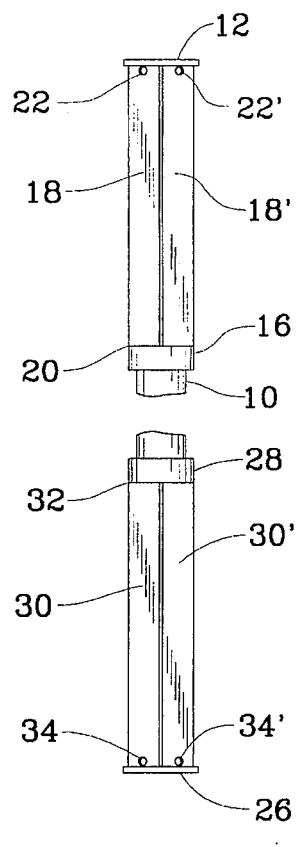
FIG. 1 is a side view of the banding post of the instant invention in a closed position.

Now referring to FIG. 1, set forth is the tire stacking device formed from an elongated rigid cylindrical banding post 10 having cap 12 coupled to one end of the post 10 and sleeve 16 slidably attached to the perimeter. A plurality of individual upper legs 18 are hingedly secured along fold line 20 with through-holes 22 for securement to elastic straps. On the opposite end of the banding post 10 is end cap 26 with second sleeve 28 slidably attached to the perimeter and hingedly coupled to lower legs 30 along fold line 32. Lower legs 30 include through-holes 34 providing attachment to elastic straps for fastening the lower legs 30 to the upper legs 18.

Figure 2:
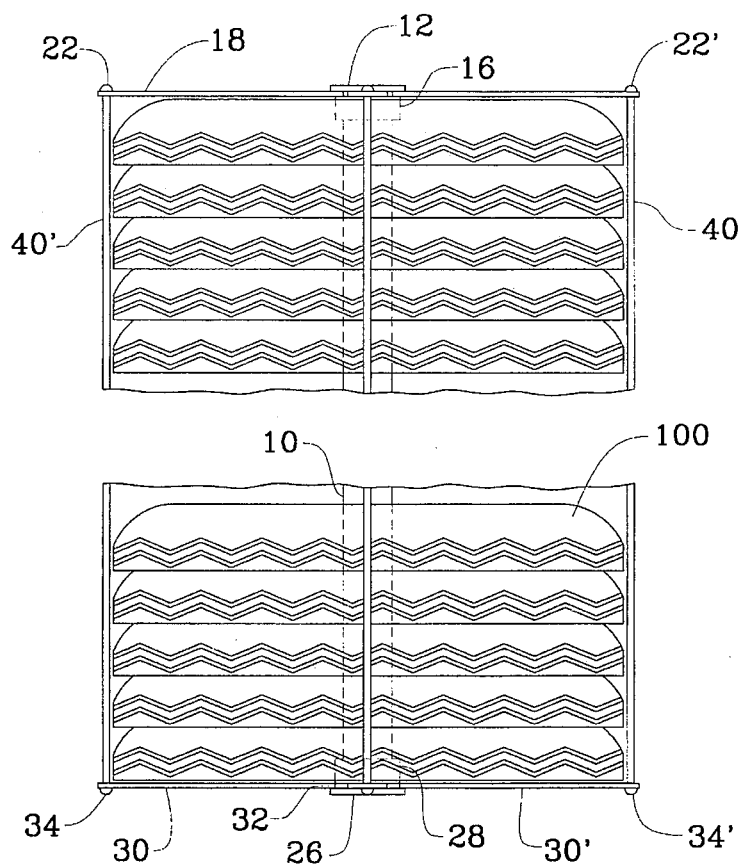
FIG. 2 is a side view of the banding post placed in an open position with a plurality of cut-tires placed therebetween.
Figure 3:
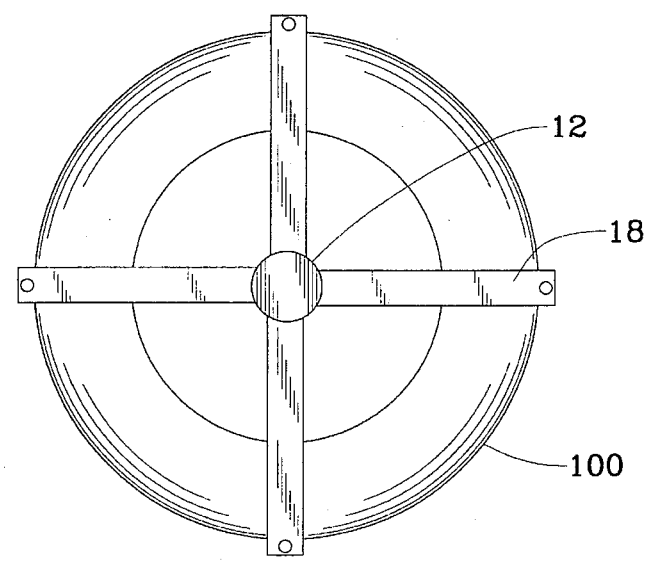
FIG. 3 is a top view of FIG. 2.

Referring to FIGS. 2 and 3, the banding post 10 is shown with sleeve 28 placed adjacent to end 26 by movement of legs 30 outwardly, perpendicular to an axis of the post, forming a base support along fold line 32. By way of illustration, split tires 100 are stacked on a length of the post with legs 30 providing a base support. The curvature of each tire facing the same direction. The upper portion illustrates sleeve 16 placed adjacent to end 12 with legs 18 placed perpendicular to the banding post 10 compressing a top side surface of the tires 100. Banding straps 40 coupled to holes 22 and 34 of legs 18 and 30 bias the legs together maintaining a secure stance by placing pressure on each side surface end of the split tires to prevent shifting. The tires are stable in their split position as each open end allows frictional engagement to a subsequent tire. It is noted that sleeve 16 may be threaded onto post 10 or incorporate the like biasing mechanism to compress the tires 100 between the upper legs 18 and lower legs 30 without banding straps.

Figure 4:
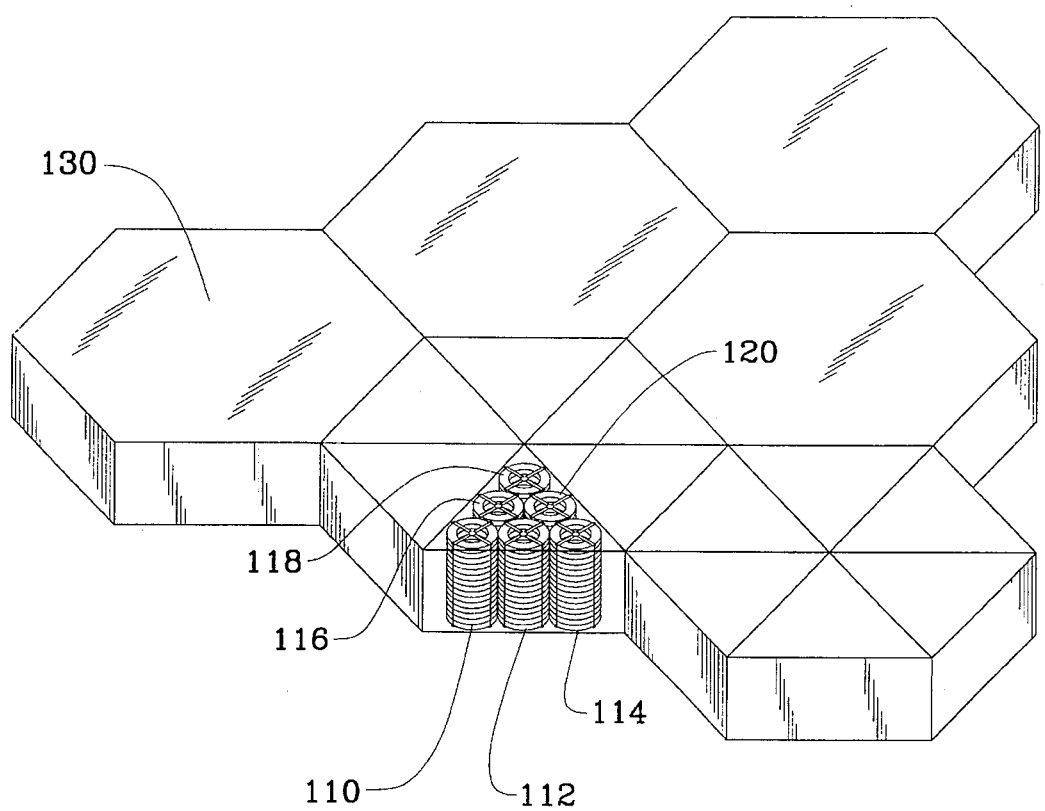
FIG. 4 is a pictorial view of a bundle of vertically stacked tires forming a triangular shape as part of a hexagon configuration in a honeycomb structure.

Referring to FIG. 4, a pictorial view of a plurality of tires is provided placed in a stacked position. A triangular tire bundle is formed by a first row of tires consisting of tire stack 110, 112 and 114 placed side-by-side, with a second row of stacked tires 116 and 118 placed next to the first row and stack 120 placed in between the curvature formed by stacks 116 and 118. In this manner, the stacked tires form a triangular shape with a nesting ability allowing banding of the tires to form the triangular shaped bundle. The triangular shaped bundle is then placed in a hexagon configuration with six triangular tire bundles forming a stable shape having the ability to consume approximately one thousand discarded tires. The honeycomb type pattern 130 is based on the hexagon configuration in interrelating forms providing a structure capable of supporting a building, runway, road, or in a free-standing mode provide an artificial reef.

Figure 5:
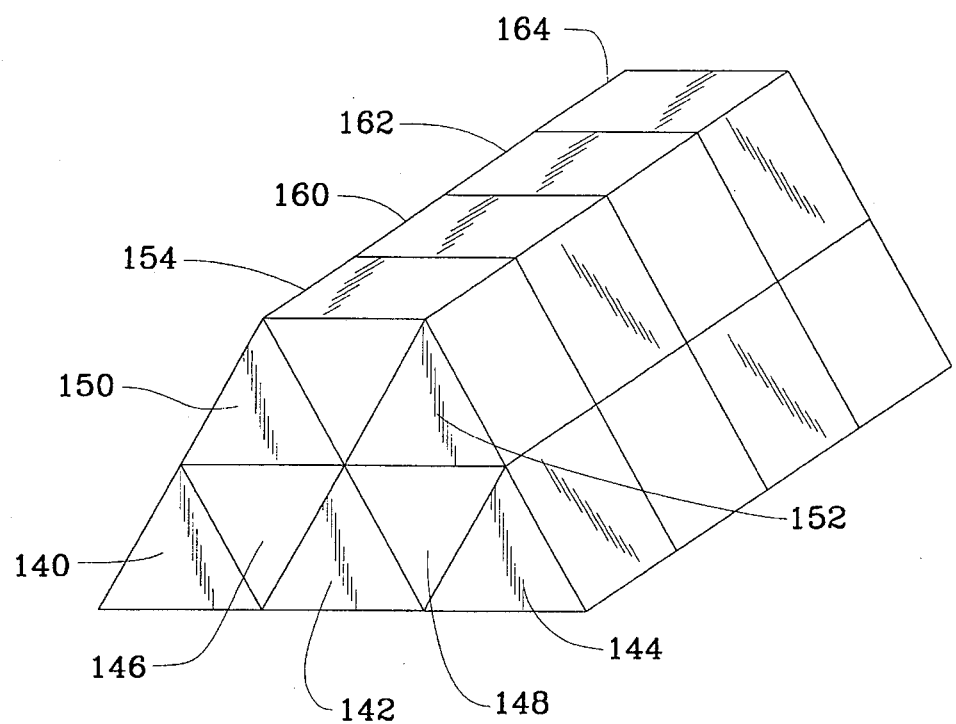
FIG. 5 is a pictorial view of horizontally disposed triangular tire bundles.

FIG. 5 provide a horizontal illustration of a structure formed from a plurality of tire stacks. In this embodiment the triangular shaped bundles 140, 142 and 144 are placed adjacent to each other with tire bundles 146 and 148 placed therebetween. Triangular bundles 150 and 152 are placed on top of bundles 146 and 148 with tire bundle 154 positioned thereon. As noted, this first stack may be extended by placement of tire stack 160 which is followed by tire stack 162 and 164 allowing a wave reef to be built of any length. As each bundle may be made up of over one-thousand tires, the wave reef not only can be used to reduce beach erosion but further lessens the impact on landfills. This may further be enlarged for such purposes as levy construction where the size of the bank necessitates the increased shape.

Regarding shifting of the tires, it is noted that the tires are constructed of rubber having friction capabilities in and of themselves which, when biased against each other, form a structure that is capable of withstanding strong ocean currents. It should also be noted that by slicing the tires in half the ability for the tires to trap air is reduced and by proper placement of the tire in the water the trappage of air is eliminated. Thus, when the structure is used in levy construction it is important to note the curvature of tire placement so that the current does not engulf a void in the tires but rather is buffeted by the curvature of the outer shape.

The method for creating an upright structure can be summarized by the following steps: cutting used vehicle tires into two equal halves, each cut half tire having a centrally disposed aperture; positioning a plurality of banding posts in at least three rows of unequal numbered posts forming a triangular shaped bundle, each said banding post constructed from a rigid elongated cylindrical member having a first slidable sleeve with at least one leg foldable outwardly forming a base member and a second slidable sleeve having at least one leg foldable outwardly forming a top member securing said cut half tires therebetween; positioning a plurality of said cut half tires on each said support post in a uniform direction, each said banding post centrally positioned in said aperture of each said cut half tire; and securing said cut half tires to said banding post with a flexible strap. The method further includes the step of strapping each support post of said triangular shaped stack together including the step of positioning six triangular shaped stacks together forming a hexagon structure.

The method for creating a horizontal structure can be summarized as follows: cutting used vehicle tires into two equal halves, each cut half tire having a centrally disposed aperture; forming a tire stack by positioning a plurality of tire halves on a banding post constructed from a rigid material having a means for securing said tires therebetween; positioning a plurality of said cut half tires on each said banding post in a uniform direction, each said banding post centrally positioned in said aperture of each said cut half tire; securing said cut half tires to each said banding post; and placing said triangular shaped stacks in a horizontal plane is further defined as having a first row of six triangular stacks placed adjacent to each other with a second row of three triangular stacks disposed thereon.

It is to be understood that while we have illustrated and described certain forms of our invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. A tire stacking method comprising the steps of:
splitting a plurality of used vehicle tires into two equal halves;
stacking a plurality of split tires on top of each other in a uniform direction forming a centrally disposed aperture;
positioning a banding post in said aperture formed by split tires; and
securing split tires to said banding post.

2. The tire stacking method according to claim 1 wherein said banding post is defined as an elongated cylindrical rigid rod having a first end with a member positionable along a top side surface of the split tires and a second member positionable along a bottom side surface of the split tires; and a compression means for moving said first member towards said second member securing said split tires therebetween.

3. A tire stacking method comprising the steps of:
splitting a plurality of used vehicle tires into two equal halves;
positioning a plurality of elongated cylindrical rigid banding posts each having a first end and a second end in at least three rows forming a triangular shaped stack;
stacking a plurality of split tires over each said banding post in a uniform direction; and
securing the split tires to each said banding post; and
compressing the split tires between said first end and said second end of said banding posts
coupling each said banding post of the triangular shaped stack together to form an integral bundle.

4. The tire stacking method according to claim 3 wherein the split tires are secured to each said banding post by an elastic member coupled to said first end and said second end.

5. The method for tire stacking according to claim 3 including the step of placing six triangular shaped stacks together forming a hexagon structure.

6. The method for tire stacking according to claim 3 including the step of placing clusters of six triangular shaped stacks in an upright position along the ocean floor to form a hexagon reef structure.

7. The method for tire stacking according to claim 3 including the step of placing clusters of six triangular shaped stacks in an upright position beneath a building structure to form a hexagon clean fill support structure.

8. The method for tire stacking according to claim 3 including the step of placing triangular shaped stacks in a horizontal position along the ocean floor to form a barrier reef.

9. The method for tire stacking according to claim 3 including the step of placing triangular shaped stacks in a horizontal position along the sides of rivers to provide the basis for a levy.

10. The method for tire stacking according to claim 9 including the step of positioning each triangular shaped stack such that the uniform direction provides a curved side surface directed toward the current of a river.

11. A banding post comprising:

an elongated cylindrical rigid rod having a first end and a second end;

a first member means coupled to said rod and formed from a slidable sleeve having at least two legs hingedly attached to said sleeve with a distal end of said legs foldable outwardly into a perpendicular stance when said sleeve is placed adjacent to said first end of said rod;

a second member means coupled to said rod and formed from a slidable sleeve having at least two legs hingedly attached to said sleeve with a distal end of said legs foldable outwardly into a perpendicular stance when said sleeve is placed adjacent to said second end of said rod;

means for binding said distal ends of said first member means to said second member means for securing a plurality of split tires therebetween.

12. The banding post according to claim 11 wherein said rod is constructed of plastic.

13. The banding post according to claim 11 wherein said rod is constructed of metal.

14. The banding post according to claim 11 wherein said means for binding is further defined as elastic straps.

* * * * *